United States Patent Office 2,971,459
Patented Feb. 14, 1961

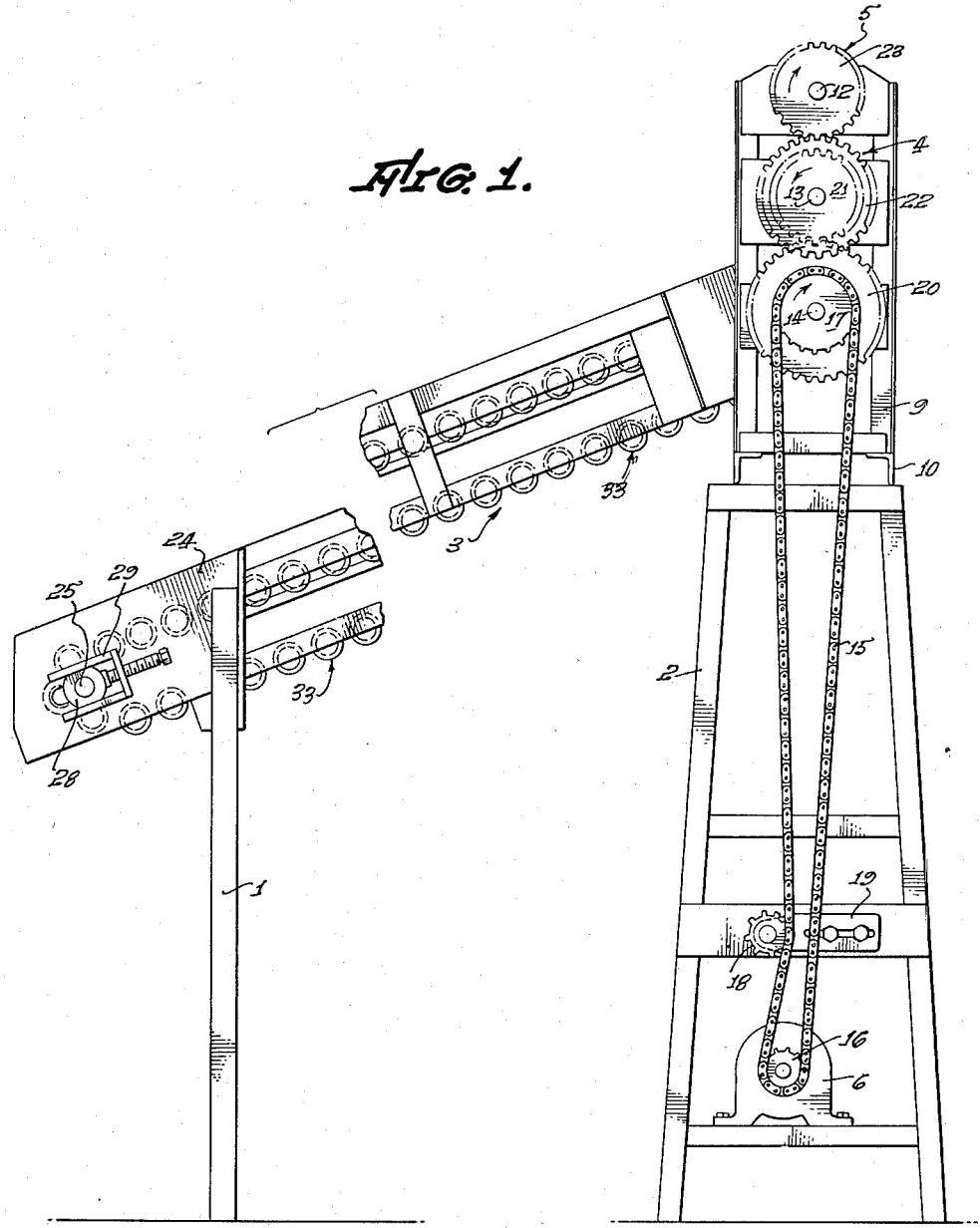

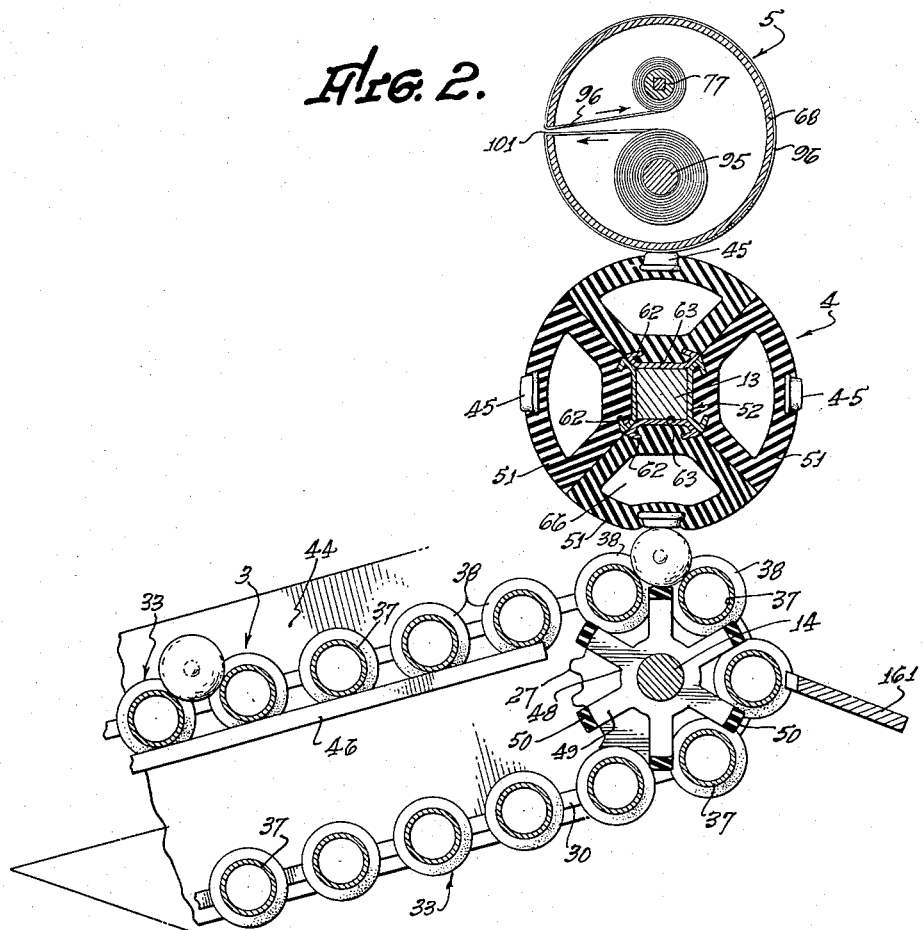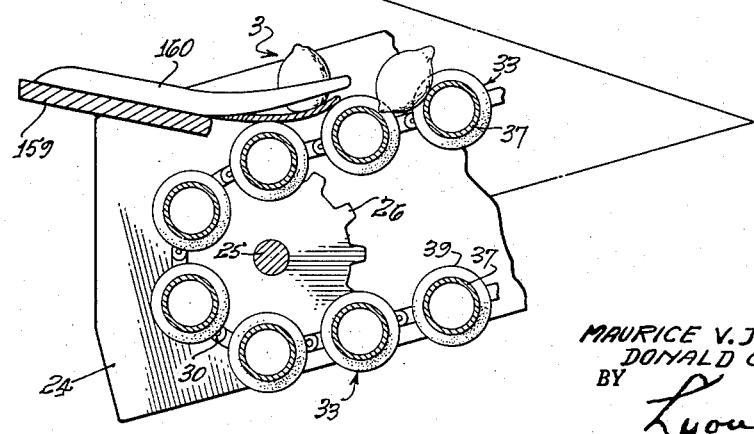

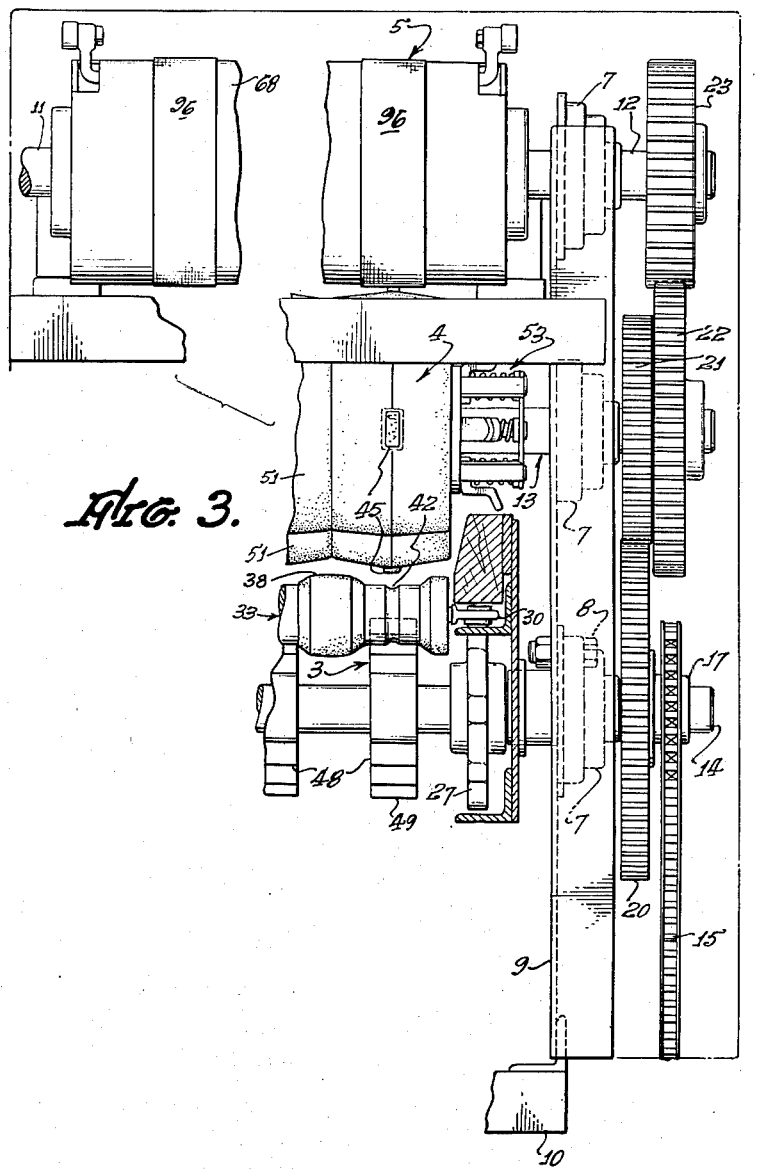

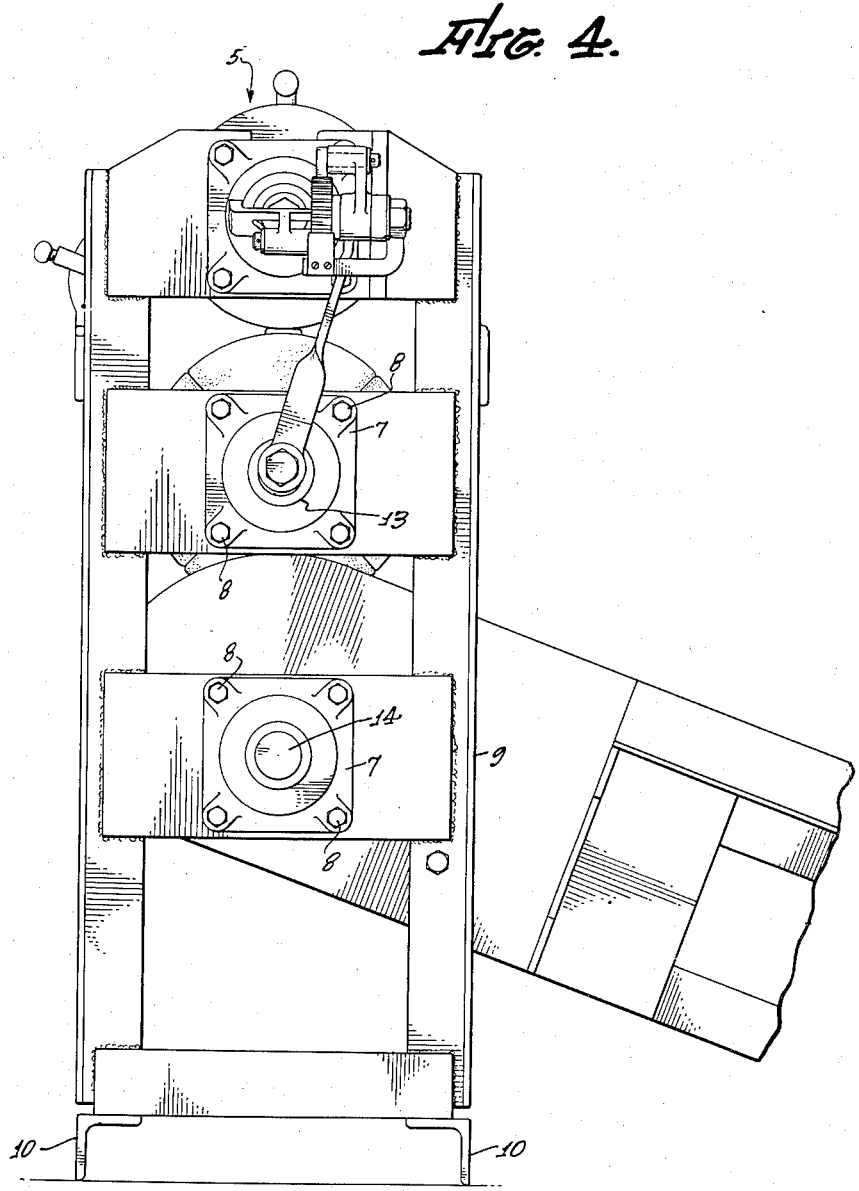

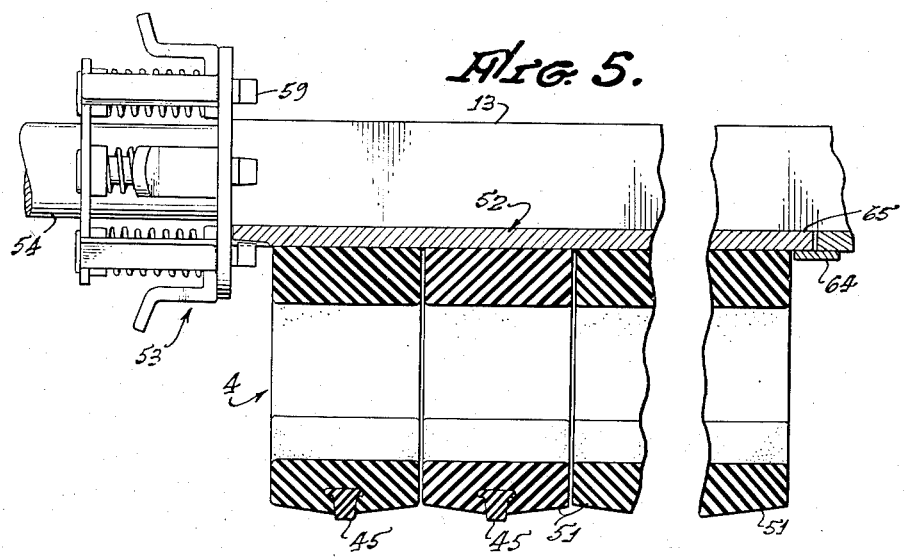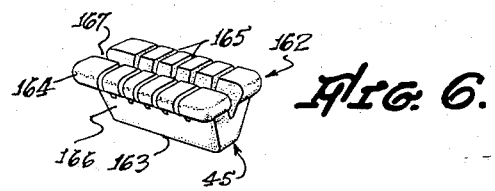

2,971,459
RESILIENT PRINTING DIE

Maurice V. Johnson, Jr., Upland, and Donald C. Savage, Ontario, Calif., assignors to Sunkist Growers, Inc., Los Angeles, Calif., a corporation of California Original application Feb. 2, 1956, Ser. No. 563,045. Divided and this application Sept. 15, 1958, Ser. No. 761,050

2 Claims. (Cl. 101—379)

This invention relates to printing machines and more particularly to a machine especially capable of printing citrus fruit, eggs, apples, cantaloupes, nuts, potatoes, avocados, tomatoes and other substantially cross sectionally circular objects.

This is a divisional application of our copending application Serial No. 563,045, filed February 2, 1956, entitled "Printing Machine."

Our invention will be disclosed with specific reference to the printing of trademarks or other indicia upon lemons, since that fruit, due to its ellipsoidal shape, variance in diameter from fruit to fruit and irregular and easily bruised surface, is difficult to effectively print. It will be apparent, however, that our machine is eminently adapted to print other fruits, nuts, vegetables or articles of manufacture which have a substantially circular cross section.

While many fruit and vegetable stampers or markers have been proposed, the printing of lemons with trademarks has not yet been accomplished commercially and there is not yet known a machine which will satisfactorily serve this function. The obovate to ellipsoidal form of the lemon renders it necessary to orient the friut so that in passing through the printing assembly the smoothest, most gently rounded surface of the fruit is presented to the printing die. If the fruit is contacted by the die at either its stem or blossom end, it is evident that a true impression of the indicia will not be obtained. In addition to the problems resulting from the shape of the lemon, further problems are created by their large variation in size. The diameter of an average lemon is about 2⅛ inches but this varies from as little or less than 1½ inches to as much as 3⅛ inches or more; consequently a printing machine will not successfully print lemons which have not been previously classified as to size unless it is capable of properly functioning over at least this size range. The problem is further compounded by the fact that lemons grown in the Pacific coastal areas and in other areas having cooler climates, which account for a large percentage of the lemon production of the United States, lack resiliency and have an irregular relatively stiff inflexible peel easily subject to damage by bruising. These characteristics make it impossible to rely upon compression of the fruit itself to compensate for variation in size from fruit to fruit, which would be required if the support to die distance were fixed and unyielding. Irrespective of the size of fruit passing through the printing assembly, it is essential that there be a firm but not severe contact between every part of the die and the lemon at the time of printing. If the contact is not firm enough the indicia will not be clearly printed upon the lemon, while if it is too firm, the die may rupture the peel and possibly inoculate it with mold spores or bacteria or in any event render the fruit subject to future inoculation.

A further difficulty involves the requirement that there be substantially no relative velocity between the die and the lemon surface being printed. If there is such relative velocity, i.e., if the lemon surface is moving past the die at a velocity less than or greater than that of the die, the die will not impress its designation clearly but will produce a smeared unreadable mark.

It will be evident that any printing machine suitable for utilization in the printing of random sizes of lemons must be capble of orienting and aligning the fruit; it must be capable of printing constantly changing sizes of lemons; it must provide a firm but not severe contact between the die and the fruit; and it must function in such manner that there is substantially no relative velocity between the die and the fruit. Of course, it must, in addition, be capable of handling large volumes of fruit at a minimum cost.

It is therefore one of the objects of our invention to provide a printing die for use in a machine fulfilling all of the requirements set forth in the preceding paragraph.

Further objects of our invention will become apparent from a consideration of the drawings in which:

Figure 1 is an elevation showing the right hand side of our machine;

Figure 2 is a sectional view through the printing drum, printing tube, and a portion of the conveyor;

Figure 3 is an elevation view of the printing tube, printing drum, and a portion of the conveyor with parts shown in section;

Figure 4 is an elevation showing the left hand side of our machine, part of the conveyor being omitted;

Figure 5 is a detail view, partly in section, of a portion of the printing drum of our machine; and Figure 6 is a perspective view of an improved form of a printing die.

With more specific reference to the drawings, our machine, which is mounted upon suitable supporting frames 1 and 2, is composed of an orienting conveyor 3, a rotary printing drum 4 and an inking ribbon tube 5 all driven by a motor 6 or other suitable driving means.

As shown in Figure 3, the ribbon tube, printing drum and conveyor drive shafts are rotatably mounted in bearings 7 secured by bolts 8 to side frames 9 which are in turn secured to supporting cross members 10 (Fig. 1) attached to supporting frame 2. The ribbon tube 5 is fixed to stub shafts 11 and 12 while the printing drum 4 is mounted on shaft 13. Conveyor drive shaft 14 is provided for supporting conveyor sprockets and platens hereinafter described. Shafts 13 and 14 are parallel to each other and to ribbon tube shafts 11 and 12. The conveyor drive shaft is driven (Figure 1) by chain 15 which is trained over sprocket 16 on the motor shaft and sprocket 17 on conveyor shaft 14. If desired, a suitable chain tension adjusting mechanism, such as sprocket 18 rotatably mounted on adjustable bracket 19, may be provided. Gear 20 secured to shaft 14 meshes with gear 21 keyed to shaft 13. Another gear 22 attached to the shaft 13 exteriorly of gear 21 engages and drives gear 23 secured to shaft 12. Through this drive arrangement the conveyor drive shaft, printing drum and ribbon tube are rotated in the directions indicated by the arrows in Figure 2.

The orienting conveyor is supported at its delivery end upon drive shaft 14. The receiving end of the conveyor is supported on shaft 25 mounted in bearings 28 in side plates 24 fixed to support frame 1. A pair of sprockets 26 are mounted at opposite ends of the shaft 25 in alignment with a pair of sprockets 27 secured to drive shaft 14. Bearings 28 (Figure 1) are longitudinally adjustable by a conventional take-up device 29 secured to the side plates of the conveyor unit. Conveyor chains 30 are trained over the corresponding sprockets on shafts 14 and 25. Alternate individual links 31 of the chain are provided with journals 32 upon which rollers 33 are rotatably mounted.

Referring to Figure 2 the individual rotating rollers 33 of the conveyor unit 3 consist of cylinders 37 of suitable material, such as aluminum, upon which intermediate annular sleeves 38 and a pair of end sleeves 39 are secured. The sleeves are of trapezoidal longitudinal half section and are preferably made of rubber to avoid injury to the lemons. Arcuate annular grooves 42 are formed in each of the cylinders 37 at points midway between the sleeves.

It will be noted from a consideration of Figures 1 and 3 that the grooves 42 are in alignment with printing dies 45. These grooves are of arcuate form but not of sufficient width or depth to receive or contact the major surface of the lemons.

Securely mounted upon conveyor drive shaft 14 are a plurality of rotary platens 48 (Figure 2) having spokes 49 which extend between adjacent rollers and assist in supporting the fruit during the printing thereof. In order to properly perform their supporting function, the spokes are so arranged and of such length as to extend into pockets 44 between the rollers to the circle of revolution defined by the rotation of the axis of each of the rollers about the shaft 14. The width of the spokes is less than the distance between adjacent cylinders 37 but greater than the distance between the sleeves 38. In addition, the spokes are no greater in thickness than the dimension 40. If desired, each spoke may be tipped with rubber 50 or other flexible, resilient material in order to provide a somewhat yielding supporting surface that will not injure the fruit.

As best seen in Figures 2 and 5, the printing drum assembly 4 is composed of shaft 13 and segmental die holders 51 secured on the shaft by retaining bars 52, which are detachably secured to shaft 13 by spring lock assembly 53. The shaft 13 is square in cross section throughout its length except for journal portions 54 at each end, which are journaled in the bearings 7. The retaining bars 52 are long strips and, as shown in Figure 2, are flanged along their longitudinal edges at an angle from the flat portion of said retaining bars. These edges are in addition bent toward one another to provide inwardly extending flanges 62. The base portion 63 of the retaining bars 52 is flat and abuts against a flat surface portion of the shaft 13. This shaft is provided at an intermediate portion or at its opposite end with a retaining flange 64 on each of the flat portions of the shaft. One end 65 of the bar 52 is retained between the surface of the shaft 13 and the flange 64. It will be apparent that each bar 52 is detachably secured to the flat surfaces of shaft 13.

Referring to Figure 2 the segmental die holders 51 are constructed of rubber, sponge rubber or other flexible resilient material and are provided with slots into which the flanges 62 fit to removably secure the holders to the retaining bars. The printing dies 45 are wedged or keyed into openings provided in the circumferential portion of the die holder segments. The segments may be provided with cavities 66 of any desired size of shape to provide the requisite flexibility of the segments depending on the nature of the material used in their fabrication.

At each end of the inking ribbon tube is a ribbon drive gear, not shown, which drives the shaft on which ribbon take-up spools 77 are detachably mounted for rotation therewith.

As illustrated in Figure 2 inking ribbon 96 is withdrawn from the feed spool 95, inserted through ribbon feed slot 101, wound about the ribbon tube in a clockwise direction, inserted back through slot 101 and attached to take-up spool 77. As tube 5 rotates in a clockwise direction as shown in Figure 2, the inking ribbon 96 is drawn over the outer surface of the ribbon tube and wound upon spool 77, thus constantly renewing the inking ribbon which contacts the dies 45. When the ribbon is completely used, the spools are removed from the ribbon tube assembly and new ribbon is installed.

As shown in Figure 2, we provide a delivery board 159 for our conveyor. This is secured to the side plates 24 and is provided with a plurality of fingers or guides 160 mounted at positions corresponding with the locations of the sleeves 38 of each individual roller. While these guides assist in assuring that individual aligned pockets such as those indicated by the reference numeral 44 receive only a single fruit, they are not essential to the proper functioning of our conveyor unit. A suitable board 161 is provided to receive printed fruit delivered from the machine.

Although die 45 may be constructed of any suitable material such as rubber or other flexible resilient material and may be solid in longitudinal as well as transverse cross section, we have discovered that the desired impression of the mark upon the fruit may be obtained by utilizing the inventive details shown in Figure 6 while substantially increasing the operative life of the die and completely avoiding any possibility of rupturing the skin of the lemon.

The die of Figure 6, which is generally identified by the reference numeral 162, takes the form of an isosceles trapezoid in transverse and longitudinal section. The face 163 contains the letters or symbols which it is desired to print on the fruit, while the back has a peripheral rounded flange 164 protruding therefrom about the entire periphery thereof, including its sides and ends. This flange permits easy insertion into and retention of the die about its entire base by the die holders 51 as illustrated for the die 45 in Figure 10. A plurality of transverse parallel slits 165 extend through the flange 164 and a centrally located longitudinal slit 167 similarly extends through the flange 164. Slits 165 and slit 167 extend partly into the body portion 166 of the die. The longitudinal and transverse slits combined with the novel shape of our die greatly increase its overall flexibility and compressibility without appreciably decreasing the rigidity of the numerals or symbols on its face.

We have also discovered that the flexibility of die 162 can be further increased without appreciably decreasing the rigidity of the numerals or symbols by constructing the die in such manner that the indicia and body portion closest to the indicia are made of a harder rubber than the remaining portion of the die. This can be accomplished during the molding process by first inserting a rubber having a Shor hardness of about 70 and filling the remainder of the mold with a rubber having a Shor hardness of about 40 before exerting heat and pressure upon the mold to cause some commingling of the two rubber materials, as will be readily understood. The resulting die has a soft resilient back and a relatively rigid face, and has a body portion of progressively diminishing rigidity as the back is reached.

In operation our printing machine is installed so that a conveyor belt, not shown, will feed lemons to the delivery board 159 and so that dropboard 161 secured adjacent the delivery end of the conveyor directs the printed fruit to a receiving conveyor, a sizer or to other lemon treating apparatus. Upon operation of the motor 6, drive chain 15 rotates the sprocket 17 on the shaft 14, thus rotating sprockets 27 which drive the pair of chains 30 and move the upper run of conveyor rollers toward the printing drum. As these rollers progress they are contacted by a roll actuating member 46, which causes each roller to rotate in a clockwise direction as viewed in Figure 2. This rotation permits the retention of but a single fruit within the individual pockets 44 defined by adjacent rollers 33. As previously noted, the rotation and the particular shape of these rollers are responsible for the orientation of the longitudinal axis of each fruit to a position parallel to the axis of the rollers. In addition, the annular channel 42 and the angled shoulders 43 result in the transverse alignment of individual lemons with the dies 45, thus presenting the most gently rounded surface of the lemon to the die for printing. The die holder drum 4 is rotated in a counterclockwise direction in the illustrations of Figure 2 by gear 21 which is driven by gear 20 secured to the shaft 14. Each individual die 45 contacts the inking ribbon at a point diametrically opposed from the point of printing. The inking ribbon tube is rotated in a clockwise direction, as seen in Figure 2, by gear 23 driven by gear 22 secured to the die holder shaft 13.

While we have exemplified the novel inventive aspects of our printing die with reference to the problem of printing lemons, it will be apparent that it is equally adapted for the impression of brands upon other cross sectionally circular articles and specifically oranges, grapefruit, apples, potatoes, tomatoes, nuts, avocados and other fruits and vegetables.

We claim:

1. A printing die comprising an integral flexible resilient body having both a transverse and longitudinal trapezoidal section, the face of said body being defined by one parallel side having the smaller area and the base of said body being defined by the other parallel side having the larger area, said face bearing printing indicia, said base having a peripheral rounded flange protruding therefrom and extending completely around its periphery, said body being provided with a central longitudinal slit extending throughout the length thereof to enable said base to be laterally compressed and having a plurality of transverse slits extending thereacross to permit said base to be longitudinally compressed, each of said longitudinal and transverse slits extending through said peripheral flange and said base and terminating within said body, whereby said base may be contracted both laterally and longitudinally to permit the same to be inserted into a die opening having an undercut groove to receive the rounded flange, the die opening being of shorter length and less width than the flanged base when in its uncontracted state.

2. The printing die of claim 1 in which the face and a portion of the resilient body adjacent thereto comprises material of one hardness and the remainder of the resilient body comprises a material of a greater hardness, and wherein a portion of the materials are commingled so that said flexible resilient material diminishes in rigidity and increases in pliability and resiliency as a functon of the distance within said body from said face.

References Cited in the file of this patent

UNITED STATES PATENTS

| | | |
|---|---|---|
| 796,132 | Laycock | Aug. 1, 1905 |
| 921,224 | Frost | May 11, 1909 |
| 972,359 | Gibson | Oct. 11, 1910 |
| 1,191,820 | Pannier | July 18, 1916 |
| 1,972,953 | Reynolds | Sept. 11, 1934 |
| 2,201,302 | Rowe | May 21, 1940 |
| 2,272,254 | Swan | Feb. 10, 1942 |
| 2,284,095 | Jordan | May 26, 1942 |

FOREIGN PATENTS

| | | |
|---|---|---|
| 286,881 | Great Britain | Mar. 15, 1928 |